(12) United States Patent
Hashimoto

(10) Patent No.: US 9,517,704 B2
(45) Date of Patent: Dec. 13, 2016

(54) APPARATUS FOR CONTROLLING ROTARY MACHINE

(71) Applicant: DENSO CORPORATION, Kariya, Aichi-pref. (JP)

(72) Inventor: Syo Hashimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/830,008

(22) Filed: Aug. 19, 2015

(65) Prior Publication Data

US 2016/0056739 A1 Feb. 25, 2016

(30) Foreign Application Priority Data

Aug. 19, 2014 (JP) .................... 2014-166387

(51) Int. Cl.
*H02P 1/04* (2006.01)
*B60L 15/20* (2006.01)
*B60L 3/00* (2006.01)

(52) U.S. Cl.
CPC .............. *B60L 15/20* (2013.01); *B60L 3/0061* (2013.01); *Y02T 10/7258* (2013.01)

(58) Field of Classification Search
CPC ................ B60L 15/20; B60L 2240/421; B60L 2240/423; B60L 2240/12; B60L 3/0061; B62D 5/0472; H02P 6/10
USPC ............ 318/400.09, 400.11, 400.15, 400.26, 432,318/451; 180/65.1, 65.51, 65.6, 69.23
See application file for complete search history.

(56) References Cited

U.S. PATENT DOCUMENTS

| | | | | |
|---|---|---|---|---|
| 5,534,764 A | * | 7/1996 | Masaki | ..................... B60L 3/00 180/170 |
| 6,720,746 B2 | * | 4/2004 | Amann | ................... B60L 15/20 180/65.1 |
| 7,110,867 B2 | * | 9/2006 | Imazu | ................... B60K 6/445 180/65.1 |
| 7,190,134 B2 | * | 3/2007 | Shibata | ............... H02P 29/0038 318/400.23 |
| 9,037,301 B2 | * | 5/2015 | Morris | .................. B60W 10/02 700/275 |

FOREIGN PATENT DOCUMENTS

| | | |
|---|---|---|
| JP | 2005-354774 A | 12/2005 |
| JP | 2013-090434 A | 5/2013 |
| JP | 2016-039661 A | 3/2016 |

* cited by examiner

*Primary Examiner* — Bentsu Ro
*Assistant Examiner* — Thai Dinh
(74) *Attorney, Agent, or Firm* — Oliff PLC

(57) ABSTRACT

In a control apparatus, an extractor extracts, from a rotational speed of a rotating member, a vibration component included in the rotational speed of the rotating member. A first suppressor performs first suppression to suppress the rotational speed of the rotating member from changing due to change of a speed change ratio. A mode setter switchably sets one of an enabling mode to enable the first suppression or a disabling mode to disable the first suppression in the control apparatus according to a parameter indicative of the speed change ratio. A second suppressor performs second suppression to suppress change of the vibration component generated based on switching of one of the enabling mode and the disabling mode to the other thereof.

9 Claims, 8 Drawing Sheets

APPARATUS FOR CONTROLLING ROTARY MACHINE

CROSS REFERENCE TO RELATED APPLICATIONS

This application is based on and claims the benefit of priority from Japanese Patent Application 2014-166387 filed on Aug. 19, 2014, the disclosure of which is incorporated in its entirety herein by reference.

TECHNICAL FIELD

The present disclosure relates to apparatuses for controlling a rotary machine that supplies drive power to driving wheels of a vehicle via a drivetrain, i.e. a power transmission mechanism; the drivetrain includes a transmission capable of changing a speed change ratio. The speed change ratio for example represents the ratio of the rotational speed of an input shaft of the transmission to the rotational speed of an output shaft of the transmission.

BACKGROUND

Such control apparatuses include a control apparatus for reducing vibrations occurring from the drivetrain, which is for example disclosed in Japanese Patent Application Publication No. 2013-90434. In detail, the control apparatus, which is installed in a vehicle, extracts, from a measured electrical angle of a motor as an example of rotary machines, resonant frequency components of the drivetrain of the vehicle. Then, the control apparatus calculates, according to the extracted resonant frequency components, compensation torque for reducing, i.e. compensating, the resonant frequency components. Thereafter, the control apparatus corrects target torque based on the compensation torque, and controls drive of the motor according to the corrected target torque, thus reducing vibrations occurring from the drivetrain.

SUMMARY

Let us consider a case where such a control apparatus is applied to a vehicle whose drivetrain includes a first shaft coupled to an output shaft of a motor, and a second shaft coupled to driving wheels of the vehicle. In this vehicle, the measured electrical angle of the motor changes with change of the speed change ratio of the drivetrain. This change of the measured electrical angle of the motor may result in vibration components, which vibrate at frequencies identical to the resonant frequency components of the vehicle, being included in the measured electrical angle of the motor.

This may result in an excessive increase of the compensation torque calculated by the control apparatus even if there are relatively small vibrations occurring from the drivetrain. The excessively greater compensation torque may excessively increase actual output torque of the motor, resulting in shocks based on the excessively greater output torque being applied to the vehicle although the control apparatus performs the above described task for reducing vibrations from the drivetrain.

In view of the circumstances set forth above, one aspect of the present disclosure seeks to provide apparatuses for controlling a rotary machine that supplies drive power to driving wheels of a vehicle via a drivetrain of the vehicle, which are capable of addressing such a problem.

Specifically, an alternative aspect of the present disclosure aims to provide such apparatuses each capable of preventing compensation torque for compensating vibrations, which occur from the drivetrain, from excessively increasing due to change of the speed change ratio of the drivetrain.

According to a first exemplary aspect of the present disclosure, there is provided a control apparatus for a rotary electric machine of a vehicle, the vehicle being equipped with a drivetrain that includes a transmission for transmitting power output from rotation of a rotating member of the rotary electric machine to driving wheels according to a variable speed change ratio. The control apparatus includes an extractor that extracts, from a rotational speed of the rotating member, a vibration component included in the rotational speed of the rotating member, the vibration component being based on vibrations of the drivetrain. The control apparatus includes a compensation torque calculator that calculates, according to the vibration component extracted by the extractor, compensation torque that compensates for the vibrations of the drivetrain. The control apparatus includes a controller that performs drive control of the rotary electric machine according to the compensation torque. The control apparatus includes a first suppressor that performs first suppression to suppress the rotational speed of the rotating member from changing due to change of the speed change ratio. The control apparatus includes a mode setter that switchably sets one of an enabling mode to enable the first suppression and a disabling mode to disable the first suppression in the control apparatus according to a parameter indicative of the speed change ratio. The control apparatus includes a second suppressor that performs second suppression to suppress change of the vibration component generated based on switching of one of the enabling mode and the disabling mode to the other thereof.

The rotational speed of the rotating member, to which the first suppression has been applied, may greatly differ from the rotational speed of the rotating member, to which no first suppression has been applied. In this case, when one of the enabling mode and the disabling mode is switched to the other thereof, the great rotational-speed difference might steeply change the vibration component included in the rotational speed of the rotating member, thus excessively increasing the compensation torque. An excessive increase of the compensation torque might result in torque shock given to the vehicle.

In order to address such a problem, the second suppressor performs the second suppression to suppress change of the vibration component generated based on switching of one of the enabling mode and the disabling mode to the other thereof. This prevents the compensation torque from excessively increasing upon switching of one of the enabling mode and disabling mode to the other thereof, thus preventing the occurrence of torque shock in the vehicle.

According to a second exemplary aspect of the present disclosure, there is provided a control apparatus for a rotary electric machine of a vehicle, the vehicle being equipped with a drivetrain that includes a transmission for transmitting power output from rotation of a rotating member of the rotary electric machine to driving wheels according to a variable speed change ratio. The control apparatus includes a suppressor that performs first suppression to suppress a rotational speed of the rotating member from changing associated with change of the speed change ratio. The control apparatus includes a first extractor that extracts, from a suppressed rotational speed of the rotating member to which the first suppression has been applied, a first vibration component included in the suppressed rotational speed of the rotating member, the first vibration component being based on vibrations of the drivetrain. The control apparatus includes a second extractor that extracts, from the rotational speed of the rotating member, a second vibration component included in the rotational speed of the rotating member, the second vibration component being based on vibrations of the drivetrain. The control apparatus includes a mode setter that switchably sets one of an enabling mode to enable the first suppression and a disabling mode to disable the first suppression in the control apparatus according to a parameter indicative of the speed change ratio. The control apparatus includes a compensation torque calculator that calculates, according to a final vibration component input thereto, compensation torque that compensates for the vibrations of the drivetrain. The control apparatus includes a controller that performs drive control of the rotary electric machine according to the compensation torque. The control apparatus includes a gradual changer that (1) Selects the first vibration component to thereby output the first vibration component to the compensation torque calculator as the final vibration component upon the enabling mode being set in the control apparatus (2) Select the second vibration component to thereby output the second vibration component to the compensation torque calculator as the final vibration component upon the disabling mode being set in the control apparatus (3) Gradually changes the final vibration component to be output to the controller from the second vibration component to the first vibration component upon the disabling mode having been switched to the enabling mode (4) Gradually changes the final vibration component to be output to the controller from the first vibration component to the second vibration component upon the enabling mode having been switched to the disabling mode.

This gradual change of the final vibration component to be output to the controller from the second vibration component to the first vibration component upon the disabling mode having been switched to the enabling mode prevents the compensation torque from excessively increasing.

Similarly, this gradually change of the final vibration component to be output to the controller from the second vibration component to the first vibration component upon the enabling mode having been switched to the disabling mode also prevents the compensation torque from excessively increasing.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
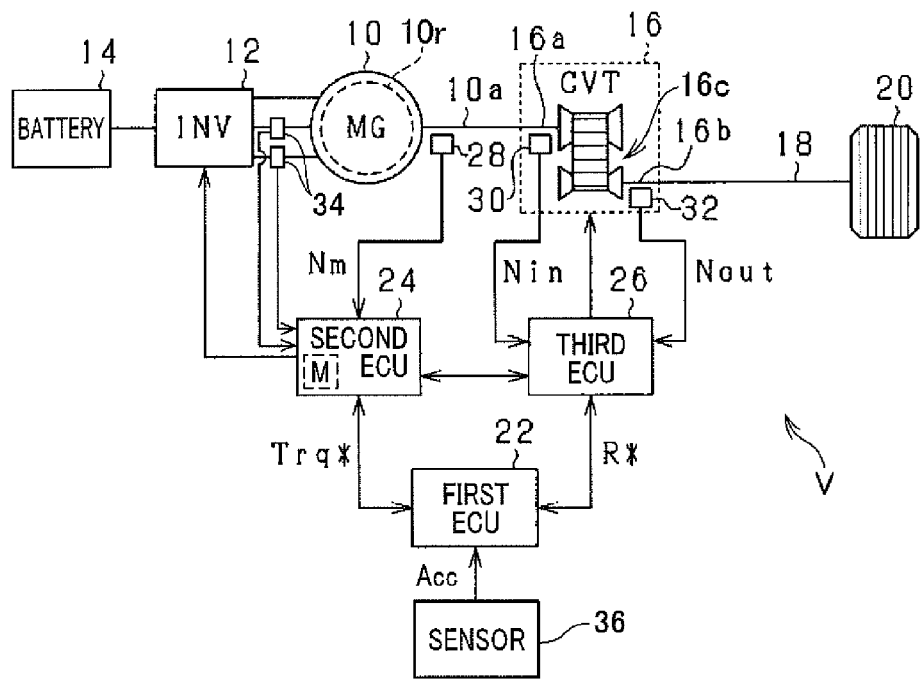
FIG. 1 is a block and structural diagram schematically illustrating an example of the structure of a vehicle control system installed in a vehicle according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description.

First Embodiment

The following describes a first embodiment of the present disclosure, to which an apparatus for controlling a rotary machine serving as a main engine of a vehicle V is applied, with reference to FIGS. 1 to 5.

Referring to FIG. 1, the vehicle V includes a motor-generator (MV) 10, an inverter 12, a battery 14, a continuously variable transmission (CVT) 16, a drive shaft 18, and driving wheels 20. The vehicle V also includes a first electronic control unit (ECU) 22, a second ECU 24, and a third ECU 26.

The motor-generator 10 serves as both a motor and a generator; the motor serves as a driving source for running the vehicle V. The first embodiment uses a multiphase rotary machine, particularly, a three-phase rotary machine including three-phase windings (U, V, W-phase windings) as the motor-generator 10. Specifically, the first embodiment is capable of using, for example, a three-phase synchronous motor as the motor-generator 10.

A three-phase voltage-controlled inverter is used as the inverter 12 when a three-phase rotary machine is used as the motor-generator 10. The inverter 12 converts a directcurrent (DC) voltage output from the battery 14 into an alternating-current (AC) voltage, and applies the AC voltage to the motor-generator 10. This voltage application causes the motor-generator 10 to serve as a motor. In contrast, the motor-generator 10 serves as a generator based on driving power received from the drive shaft 18.

The motor-generator 10 has a rotor 10r and an output shaft 10a, which will be referred to as a motor output shaft 10a, coupled to the rotor 10r. The rotor 10r and the motor output shaft 10a serve as, for example, a rotating member.

The CVT 16 has an input shaft 16a, which is coupled to the input shaft 10a, and an output shaft 16b. The CVT 16 is configured to continuously change the ratio of the rotational speed of the input shaft 16a to the rotational speed of the output shaft 16b while maintaining power transmission between the input and output shafts 16a and 16b. The ratio of the rotational speed of the input shaft 16a to the rotational speed of the output shaft 16b will be referred to simply as a speed change ratio hereinafter.

To the output shaft 16b, the driving wheels 20 are coupled via the drive shaft 18. The motor output shaft 10a of the first embodiment is configured to rotate at a rotational speed that is identical to the rotational speed of the input shaft 16a. Note that the first embodiment uses, for example, a hydraulic CVT as the CVT 16. That is, the CVT 16 includes a hydraulic drive circuit 16c for controlling the speed change ratio using hydraulic pressure.

The first embodiment defines, for example, a drivetrain, which is also called a power transmission mechanism or powertrain, including the motor output shaft 10a, the CVT 16, and the drive shaft 18. The motor output shaft 10a, the input and output shafts 16a and 16b of the CVT 16, and the drive shaft 18 each serve as an example of a rotational member that rotates as the motor-generator 10 rotates.

The vehicle V further includes a first rotational speed sensor 28, a second rotational speed sensor 30, and a third rotational speed sensor 32. The first rotational speed sensor 28 measures a rotational speed of the motor output shaft 10a, i.e. the rotor 10r, which will be referred to as a motor rotational speed. The second rotational speed sensor 30 measures a rotational speed of the input shaft 16a, which will be referred to as an input rotational speed. The third rotational speed sensor 32 measures a rotational speed of the output shaft 16b, which will be referred to as an output rotational speed.

The measurement values of the first rotational speed sensor 28 are input to the second ECU 24, and the measurement values of the second and third rotational speed sensors 30 and 32 are input to the third ECU 26. Note that the first embodiment can provide a sensor in the vehicle V; the sensor is capable of measuring an electrical rotational angle or an electrical rotational angular velocity of the rotor 10r of the motor-generator 10. In this case, the second ECU 24 can calculate the motor rotational speed according to the measured electrical rotational angle or electrical angular speed of the rotor 10r.

The vehicle V additionally includes current sensors 34. The current sensors 34 are operative to measure currents flowing through at least two windings, for example, V- and W-phase windings, in the three-phase windings of the motor-generator 10 as V- and W-phase currents. Then, the current sensors 34 send the measured V- and W-phase currents to the second ECU 24.

Each of the first, second, and third ECUs 22, 24, and 26 is designed as, for example, a microcomputer circuit including essentially, for example, a CPU, a memory unit M including a ROM and a RAM, and input/output units. Each of the first to third ECUs 22, 24, and 26, i.e. a corresponding CPU, runs various programs stored in, for example, the ROM. These first to third ECUs 22, 24, and 26 are configured to communicate information with each other.

The first ECU 22 is superior to each of the second and third ECUs 24 and 26. That is, the first ECU 22 is, for example, an upstream control unit with respect to the second and third ECUs 24 and 26 in the flow of addressing vehicle's user requests. For example, the first ECU 22 supervises overall control of the vehicle V. Specifically, the first ECU 22 determines target torque Trq* for the motor-generator 10 according to, for example, a user's operated (depressed) quantity, i.e. stroke, Acc of a user-operable accelerator pedal (not shown) of the vehicle V. Then, the first ECU 22 outputs the target torque Trq* to the second ECU 24. For example, an accelerator-pedal sensor 36 measures the user's operated stroke Acc of the accelerator pedal, and sends the user's operated stroke Acc of the accelerator pedal to the first ECU 22.

The second ECU 24 serves as a control unit for controlling the motor-generator 10. The second ECU 24 receives the target torque Trq* input from the first ECU 22, the measurement values of the second and third rotational speed sensors 30 and 32 input from the third ECU 28, and the measurement values input from the first rotational speed sensor 28.

Then, the second ECU 24 controls on-off operations of for example, bridge-connected switching elements of the inverter 12 to convert the DC voltage output from the battery 14 into controlled three-phase AC voltages, thus applying the controlled three-phase AC voltages to the three-phase windings of the motor-generator 10. This controls torque of the motor-generator 10 for rotating the rotor to follow the target torque Trq*.

The third ECU 26 serves as a control unit for controlling the CVT 16. The third ECU 26 receives a target speed change ratio R* input from the first ECU 22. The third ECU 26 controls drive of the hydraulic drive circuit 16c, thus controlling the speed change ratio of the CVT 16 to follow the input target speed change ratio R*.

Figure 2:
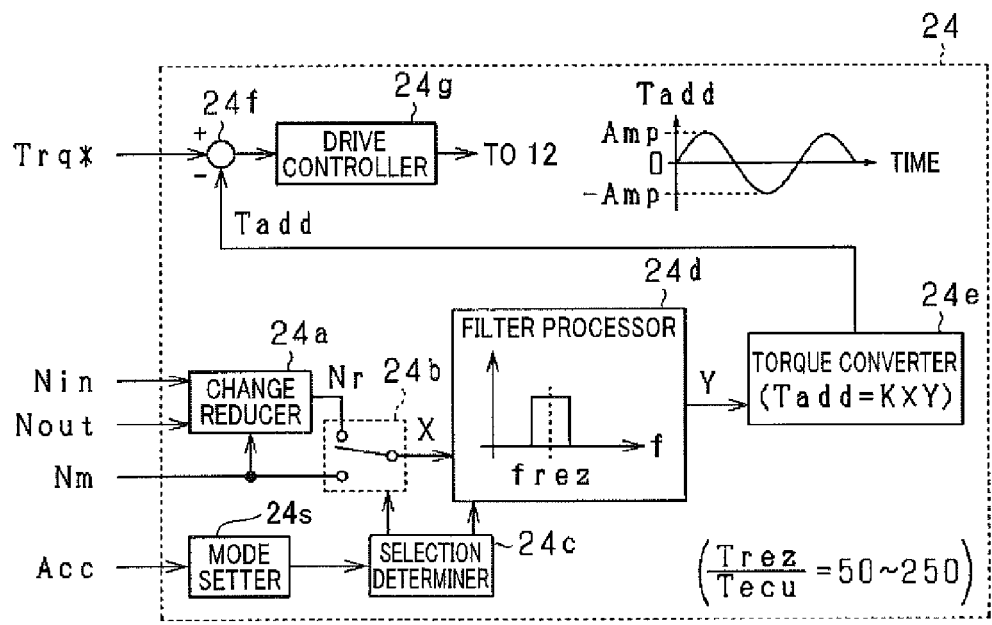
FIG. 2 is a block diagram schematically illustrating an example of the structure of a second ECU illustrated in FIG. 1.

Next, the following describes an example of the specific structure of the second ECU 24 for performing, every predetermined processing period Tecu, torque control based on the target torque Trq* with reference to the block diagram of FIG. 2.

As illustrated in FIG. 2, the second ECU 24 includes a change reducer 24a, a selector 24b, a mode setter 24s, a selection determiner 24c, a filter processor 24d, a torque converter 24e, a corrector 24f, and a drive controller 24g.

These elements 24a to 24g can be implemented in the second ECU 24 as hardware elements, software elements, and/or hardware-software hybrid elements.

The change reducer 24a, which serves as, for example, a first suppressor. That is, the change reducer 24a receives the motor rotational speed Nm, the input rotational speed Nin, and the output rotational speed Nout measured by the respective first, second, and third rotational speed sensors 28, 30, and 32. Then, the change reducer 24a performs, according to the motor rotational speed Nm, the input rotational speed Nin, and the output rotational speed Nout, a rotational-speed change reduction task described later. The rotational-speed change reduction task will be described in detail later.

An output signal from the change reducer 24a, which has been obtained based on the rotational-speed change reduction, will be referred to as a processed rotational speed signal Nr hereinafter.

The selector 24*b* receives the motor rotational speed Nm and the processed rotational speed signal Nr. The selector 14*b* selects, under control of the selection determiner 24*c*, one of the motor rotational speed Nm and the processed rotational speed signal Nr as a selected rotational speed signal X, which should be input to the filter processor 24*d*.

The mode setter 24*s* switchably sets one of an enabling mode and a disabling mode in the second ECU 24 according to the user's operated stroke Acc of the user-operable accelerator pedal of the vehicle V, and outputs one of the enabling mode and the disabling mode to the selection determiner 24*c*. The enabling mode and disabling mode will be described in detail below.

The selection determiner 24*c* controls the selector 24*b* to select which of the motor rotational speed Nm and the processed rotational speed signal Nr as the selected rotational speed signal X according to one of the enabling mode and the disabling mode output from the mode setter 24*s*.

The filter processor 24*d*, which serves as, for example, an extractor, includes, for example, a bandpass filter. The bandpass filter has a predetermined passband including a resonant frequency frez of the drivetrain. For example, the predetermined pass band has the resonant frequency frez as a center frequency thereof. The filter processor 24*d* receives the selected rotational speed signal X. Then, the filter processor 24*d* performs, for example, a known digital-filtering process on the selected rotational speed signal X, thus extracting vibration components Y included in the selected rotational speed signal X as frequency signals Y, each of which is defined as a frequency signal in a time domain. These vibration components Y are contained in at least one of the output rotational speed Nout, the input rotational speed Nin, and the motor rotational speed Nm in association with resonance of the drivetrain, i.e. resonance of the drivetrain with respect to change of the motor rotational speed Nm. The resonance of the drivetrain can be expressed as a known torsional vibration model, more specifically as a known first harmonic drivetrain torsional vibration model.

Specifically, the torsional vibration model of the drive train is comprised of a model including the moment of inertia of the motor-generator 10 and the equivalent mass moment of inertia of the vehicle V linked together via a torsional spring. For example, the first embodiment simulates that the vibration components Y include a sinusoidally fluctuating component, and each change at a frequency within the range from 2 to 10 Hz inclusive; the center of the range matches with the resonant frequency frez of the drivetrain.

The filter processor 24*d* uses, as the bandpass filter, the following infinite impulse response (IIR) filter expressed by the following equation [eq1]:

$$Y(n) = \frac{[(b2 \cdot X(n-2) - b1 \cdot X(n-1) + b0 \cdot X(n)) - (a2 \cdot Y(n-2) - a1 \cdot Y(n-1))]}{a0} \quad [\text{eq 1}]$$

Where
$a0 = 1 + 2\omega p + \omega p^2$
$a1 = 2 + 2\omega p$
$a2 = 1$
$b0 = b1 = 2\omega p$
$b2 = 0$ $\omega p$ represents an angular frequency of vibrations from the drivetrain, which should be reduced by the second ECU 24

X(n) represents a selected rotational speed signal input to the filter processor 24*d* in a current processing cycle n; n is a natural number equal to or more than 1

Y(n) represents vibration components extracted by the filter processor 24*d* in the current processing cycle n X(n–k) represents a selected rotational speed signal obtained at the (n–k)-th processing cycle, which is k processing cycles before the current processing cycle n Y(n–k) represents vibration components extracted by the filter processor 24*d* at the (n–k)-th processing cycle.

Note that a resonant angular frequency of the drivetrain can be used as the angular frequency $\omega p$.

Specifically, the filter processor 24*d* calculates the equation [eq1] every predetermined period Tecu, and outputs the calculated result of the equation [eq1] every predetermined period Tecu to the torque converter 24*e*.

For example, the torque converter 24*e* serves as a compensation torque calculator. Specifically, the torque converter 24*e* calculates, according to the vibration components, i.e. frequency signals, Y, extracted by the filter processor 24*d*, compensation torque signals Tadd for reducing, i.e. counteracting, resonance of the drivetrain. For example, the torque converter 24*e* according to the first embodiment multiplies the vibration components, i.e. frequency signals, Y by a multiplication coefficient K to thereby calculate the compensation torque signals Tadd.

The corrector 24*f* subtracts the compensation torque signals Tadd from the target torque Trq* to correct the target torque Tre*, thus obtaining final target torque Tref* that is expressed by the following equation Tref*=Trq*–Tadd. In the first embodiment, if the target torque Trq* is positive, the control mode of the inverter 12 by the second ECU 24 is set to a first control mode for causing the motor-generator 10 to serve as a motor. In contrast, if the target torque Trq* is negative, the control mode of the inverter 12 by the second ECU 24 is set to a second control mode for causing the motor-generator 10 to serve as a generator.

The drive controller 24*g* performs on-off control of the bridge-connected switching elements of the inverter 12 according to the final target torque Trqf* to convert the DC voltage output from the battery 14 into a controlled AC voltage, thus applying the controlled AC voltage to the three-phase windings of the motor-generator 10. This causes torque of the motor-generator 10 to follow the final target torque Taqf*. The drive controller 24*g* can perform known current vector control as an example of the on-off control of the switching elements of the inverter 12.

For example, the current vector control calculates, from the measured V- and W-phase currents, the remaining phase, i.e. the U-phase, current, and converts the three-phase currents (U-, V-, and W-phase currents) into a current value in a first axis and a current value in a second axis; the first axis and second axis define a rotating Cartesian coordinate system in the rotor 10*r*. The rotating Cartesian coordinate system rotates as the rotor 10*r* rotates. The current vector control obtains a first deviation between the first-axis measured current value and a first-axis command current, and a second deviation between the second-axis measured current value and a second-axis command current. Then, the current vector control obtains three-phase AC command voltages that should zero the first and second deviations. The current vector control controls on-off operations of the switching elements of the inverter 12 according to the obtained three-phase command voltages, thus causing torque of the motor-generator 10 to follow the final target torque Tre.

Specifically, the elements 24a to 24g of the second ECU 24 constitute a vehicle feedback control system that performs feedback control for torque of the motor-generator 10 every predetermined period Tecu set forth above.

In particular, the vehicle feedback control system 24a to 24g carries out feedback control for torque of the motor-generator 10, so that vibration components, i.e. frequency signals, Y are measured by the elements 24a to 24d. The torque converter 24e multiplies the measured vibration components, i.e. frequency signals, Y by the multiplication coefficient K as a feedback gain to thereby calculate the compensation torque signals Tadd. The corrector 24f corrects the target torque Trq* according to the compensation torque signals Tadd to obtain the final target torque Trqf*. According to the final target torque Trqf*, the vehicle feedback control system 24a to 24g carries out feedback control for torque of the motor-generator 10 to cause actual torque of the motor-generator 10 to follow the final target torque Trqf*.

Note that calculation of the compensation torque signals Tadd is based on the fact that the drivetrain of the vehicle V is for example configured such that the difference in phase between the motor rotational speed Nm, which is defined by the structure of the drivetrain, and the final target torque Trqf* is zero or should be zero. That is, multiplying, by the multiplication coefficient K, the amplitudes of the vibration components, i.e. frequency signals, Y to thereby adjust the amplitudes of the of the vibration components Y calculates the compensation torque signals Tadd.

If there is a phase difference between the motor rotational speed Nm and the final target torque Trqf*, the drive controller 24g can correct the phases of the compensation torque signals Tadd to match the corrected phases of the compensation torque signals Tadd with the phase of the motor rotational speed Nm.

Each of the compensation torque signals Tadd calculated by the torque converter 24e has a waveform substantially matching with the waveform of a corresponding one of the vibration components, i.e. frequency signals, Y. For example, if the vibration components Y include a sinusoidally vibrating component, the compensation torque signals Tadd include a sinusoidal signal fluctuating while crossing zero (see FIG. 2). FIG. 2 shows the amplitude of the sinusoidal signal included in the compensation torque signals Tadd as reference character Amp.

A value of the multiplication coefficient, i.e. feedback gain, K can be previously determined according to the amplitude of torque based on vibrations of the drivetrain that should be reduced; the torque is estimated by experiment or another means.

The frequencies of the vibration components, i.e. frequency signals, Y may change depending on the operations of the drivetrain. From this viewpoint, the torque converter 24e can variably set the multiplication coefficient K according to the frequencies of the vibration components, i.e. the frequency signals, Y. For example, the torque converter 24e can have relational information, such as a map or equations, in which frequencies of the vibration components, i.e. frequency signals, Y correlate with corresponding values of the multiplication coefficient K. The torque converter 24e refers to the relational information using the frequencies of the vibration components Y as input data to read values of the multiplication coefficient K respectively corresponding to the input frequencies of the vibration components Y. Then, the torque converter 24e sets the read values as values of the multiplication coefficient K.

The corrector 24f subtracts the compensation torque signals Tadd from the target torque Trq*. Note that subtraction of the compensation torque signals Tadd from the target torque Trq* represents (1) Addition of negative compensation torque signals Tadd to the target torque Trq* if the compensation torque signals Tadd are positive (2) Addition of positive compensation torque signals Tadd to the target torque Trq* if the compensation torque signals Tadd are negative.

In other words, if torque based on the vibration components Y sinusoidally fluctuates, the corrector 24d can add, to the target torque Trq*, compensation torque signals Tadd whose phases are shifted by $\pi$ with respect to the sinusoidally fluctuated torque. This can cause the negative and positive amplitudes of the compensation torque signals Tadd to cancel out the positive and negative amplitudes of the sinusoidally fluctuated torque based on the vibration components.

The first embodiment sets the period Tecu of the feedback control by the second ECU 24 to be within the range from several-tenth part to several-hundredth part of the periods, referred to as Trez, of the vibration components, i.e. frequency signals, Y. Specifically, the frequency of each of the vibration components Y is simulated to be within the range from 2 to 10 Hz inclusive. This simulates the period Trez of each of the vibration components Y to be within the range from 0.1 to 0.5 seconds inclusive. Thus, the period Tecu by the second ECU 24 is set to a value included in the range from 1/50 to 1/200 of the periods Trez of the vibration components Y inclusive, for example, set to 2 milliseconds.

The following describes the change reducer 24a, the selector 24b, and the selection determiner 24c, which are specific components of the first embodiment.

First, the following describes the change reducer 24a.

The change reducer 24a performs a task to prevent the compensation torque signals Tadd from excessively increasing when the degree of change of the motor rotational speed Nm, i.e. the change rate or acceleration of the motor rotational speed Nm, is unset to zero, in other words, the motor rotational speed Nm changes from a constant speed.

For example, rapidly change of the driver's operation of the accelerator pedal causes the speed change ratio of the CVT 16 to rapidly change. Specifically, when the driver's operation of the accelerator pedal, which is located at a large accelerating state, such as a full accelerating state, is released, the speed change ratio of the CVT 16 rapidly decreases.

The steep change of the speed change ratio causes the motor rotational speed Nm to steeply change. This results in vibration components based on the steep change of the motor rotational speed Nm being included in the motor rotational speed Nm; the vibration components vibrate at frequencies identical to frequency components of the drivetrain, which should be suppressed, i.e. the resonant frequency components of the drivetrain. In other words, a steep inclination of change of a base of the motor rotational speed Nm, on which the vibration components Y are superimposed, appears. This might result in the absolute levels of the amplitudes of the compensation torque signals Tadd for compensating resonance of the drivetrain excessively increasing in response to the steep inclination of change of the base of the motor rotational speed Nm although actual vibrations levels of the drivetrain are relatively small. This might cause the final target torque Trq* to excessively increase, resulting an increase of an actual output torque Trqr of the motor-generator 10. This might cause torque shock to the vehicle V.

The first embodiment aims to prevent the occurrence of such torque shock. Specifically, the change reducer 24a is configured to perform the rotational-speed change reduction task that reduces an amount ΔNcvt of change of the motor rotational speed Nm according to change of the speed change ratio from a total amount of change of the motor rotational speed Nm.

Next, the following describes the selector 24b and the selection determiner 24c.

The processed rotational speed signal Nr, which is output from the change reducer 24a, may greatly differ from the motor rotational speed Nm. For this reason, switching from the motor rotational speed Nm to the processed rotational speed signal Nr as the selected rotational speed signal X in the selector 24b or from the processed rotational speed signal Nr to the motor rotational speed signal Nm as the selected rotational speed signal X may result in the selected rotational speed signal X changing like a step function. Vibration components, which vibrate at frequencies identical to the resonant frequency components of the drivetrain, included in the selected rotational speed signal X might cause the compensation torque signals Tadd to excessively increase, resulting in the actual output torque Trqr of the motor-generator 10 changing in steps. In order to prevent the actual output torque Trqr of the motor-generator 10 from changing in steps, the selector 24b and the selection determiner 24c cooperatively perform a selection task described hereinafter.

Figure 3:
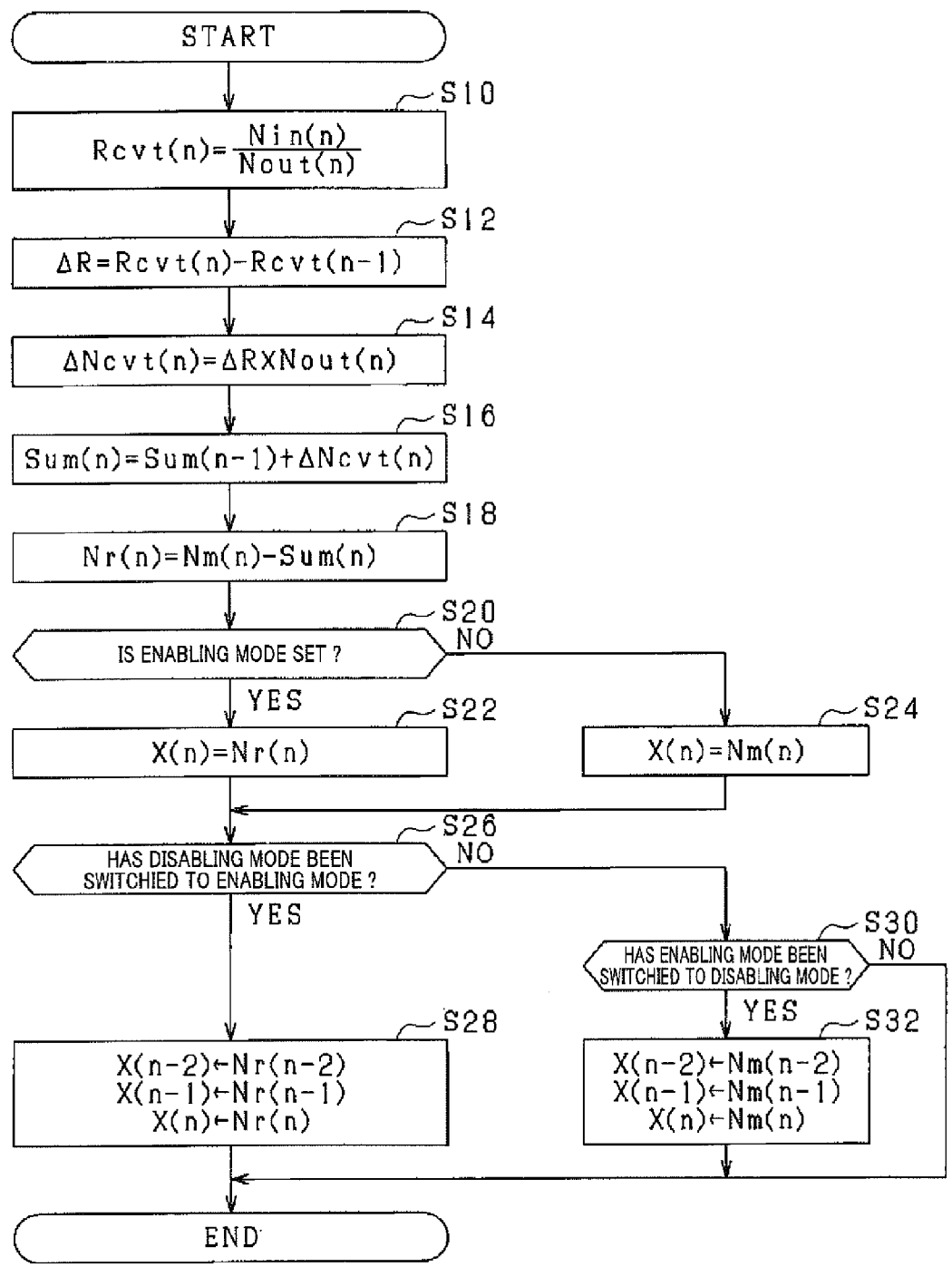
FIG. 3 is a flowchart schematically illustrating an example of a routine including a rotational-speed change reduction task and a selection task according to the first embodiment.

FIG. 3 schematically illustrates a routine of the rotational-speed change reduction task and the selection task. The second ECU 24, such as the change reducer 24a, the selector 24b, and the selection determiner 24c, performs the routine every predetermined period Tecu during, for example, the period from a user's instruction to start running of the vehicle V to a user's instruction to terminate running of the vehicle V.

According to the routine, the second ECU 24 calculates a speed change ratio Rcvt(n) in a current processing cycle n according to an input rotational speed Nin(n) and an output rotational speed Nout(n) measured in the current processing cycle n in step S10.

Specifically, the second ECU 24 divides the input rotational speed Nin(n) in the current processing cycle n by the output rotational speed Nout(n) in the current processing cycle n, thus calculating the speed change ratio Rcvt(n) in the current processing cycle n in step S10. The reason for calculating the speed change ratio Rcvt(n) based on the input rotational speed Nin(n) in the current processing cycle n and the output rotational speed Nout(n) in the current processing cycle n is to accurately know an actual speed change ratio of the CVT 16. Specifically, the second ECU 24 can use a target speed change ratio R* in the current processing cycle n as the speed change ratio Rcvt(n) in the current processing cycle n.

The CVT 16 of the first embodiment is configured as a hydraulic CVT. For this reason, a time interval from which the target speed change ratio R* is input to the third ECU 26 to which the actual speed change ratio is controlled by the third ECU 26 to the target speed change ratio R* becomes relatively long. Thus, using the target speed change ratio R* in the current processing cycle n as the speed change ratio Rcvt(n) may cause a gap based on the time interval between the speed change ratio Rcvt(n) and the actual speed change ratio. In view of the circumstances, the second ECU 24 of the first embodiment calculates the speed change ratio Rcvt(n) in the current processing cycle n according to the input rotational speed Nin(n) and the output rotational speed Nout(n) in the current processing cycle n.

Note that each of the input rotational speed Nin(n) and the output rotational speed Nout(n) includes vibration components. The amplitudes and phases of the vibration components included in the input rotational speed Nin(n) are substantially identical to the amplitudes and phases of the vibration components included in the output rotational speed Nout(n). For this reason, dividing the input rotational speed Nin(n) by the output rotational speed Nout(n) causes the vibration components included in the input rotational speed Nin(n) and the vibration components included in the output rotational speed Nout(n) to cancel out each other. This cancellation makes it possible to suppress the vibration components contained in the speed change ratio Rcvt(n) in the current processing cycle n to negligible levels.

Following the operation in step S10, the second ECU 24 subtracts a speed change ratio Rcvt(n−1) at a last previous processing cycle (n−1) from the speed change ratio Rcvt(n) in the current processing cycle n to thereby calculate a speed-change ratio change AR in the current processing cycle n in step S12. Note that the first processing cycle (n=1) sets the speed change ratio Rcvt(n−1) at the last previous processing cycle (n−1) to zero.

In step S14, the second ECU 24 calculates the product of the speed-change ratio change AR and the output rotational speed Nout(n) in the current processing cycle n as a change amount ΔNcvt(n) of the motor rotational speed Nm associated with change of the speed change ratio. The change amount ΔNcvt(n) of the motor rotational speed Nm associated with change of the speed change ratio will be referred to as a target change amount ΔNcvt(n) hereinafter.

Subsequently, the second ECU 24 adds the target change amount ΔNcvt(n) in the current processing cycle n to an integrated value Sum(n−1) of the target change amounts ΔNcvt from the timing to start running of the vehicle V to the last previous processing cycle (n−1) in step S16. This calculates an integrated value Sum(n) of the target change amounts ΔNcvt from the timing to start running of the vehicle V to the current processing cycle (n) in step S16. Note that the first embodiment sets an initial value Sum(0) of the integrated value of the target change amounts ΔNcvt to zero.

Next, the second ECU 24 subtracts the target changed quantity Sum(n) calculated in step S16 from the motor rotational speed Nm(n) obtained in the current processing cycle n, thus calculating a processed rotational speed signal Nr(n) in the current processing cycle n in step S18. The change reducer 24a is for example designed to perform the operations in steps S10 to S18 in the first embodiment.

Following the operation in step S18, the second ECU 24 determines whether the enabling mode is set therein; the enabling mode enables application of the rotational-speed change reduction task to the motor rotational speed Nm in step S20. For example, in step S20, the second ECU 24 determines, based on the user's operated stroke Acc of the accelerator pedal, whether or not the current condition of the vehicle V is changing or about to change to a predetermined condition in which steep change of the speed change ratio likely occurs. That is, the second ECU 24 determines, based on the user's operated stroke Ace of the accelerator pedal, whether the current condition of the vehicle V is changing or about to change to the predetermined condition in which acceleration request likely occurs. Note that the user's operated stroke Acc of the accelerator pedal is sent from the first ECU 22 to the second ECU 24. That is, the user's operated stroke Acc of the accelerator pedal means a parameter indicative of how the speed change ratio changes.

Upon determination that the current condition of the vehicle V is changing or about to change to the predetermined condition in which acceleration request likely occurs, the second ECU 24 determines that a change, i.e. a steep change of the speed change ratio by the CVT 16 is occurring or about to occur, thus determining that the enabling mode, which enables application of the rotational-speed change reduction task to the motor rotational speed Nm, is set therein (YES in step S20). Otherwise, upon determination that the current condition of the vehicle V is not changing or not about to change to the predetermined condition in which acceleration request likely occurs (NO in step S20), the second ECU 24 determines a steep change of the speed change ratio by the CVT 16 is not occurring or is not about to occur, thus determining that a disabling mode, which disables application of the rotational-speed change reduction task to the motor rotational speed Nm, is set therein (NO in step S20). Note that the selection determiner 24c is for example designed to perform the operation in step S20 in the first embodiment.

Upon determination that the enabling mode is set in the second ECU 24 (YES in step S20), the routine proceeds to step S22. In step S22, the second ECU 24 serves as the selector 24b to select the processed rotational speed signal Nr(n) calculated in step S18 as the selected rotational speed signal X(n) in the current processing cycle n in step S22. Note that the processed rotational speed Nr calculated in step S18 every predetermined period Tecu is stored in the memory unit M as the history of the processed rotational speeds Nr.

The processed rotational speed signal Nr(n), from which the integrated value Sum(n) has been removed, does not include the amount of change of the motor rotational speed Nm associated with change of the speed change ratio. This prevents the compensation torque signals Tadd, which are calculated based on the vibration components Y obtained by the filter processor 24c using the history of the selected rotational speed signals X(n−2), X(n−1), and X(n) respectively corresponding to the processed rotational speed signals Nr(n), Nr(n−1), Nr(n−2), from excessively increasing.

Figure 4A:
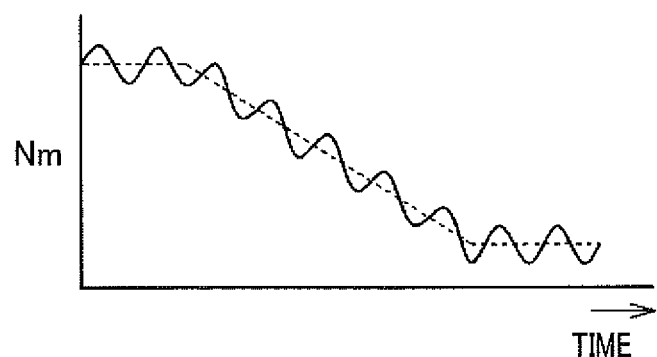
FIG. 4A is a graph schematically illustrating how a motor rotational speed, to which the rotational-speed change reduction task has not been applied, changes over time.
Figure 4B:
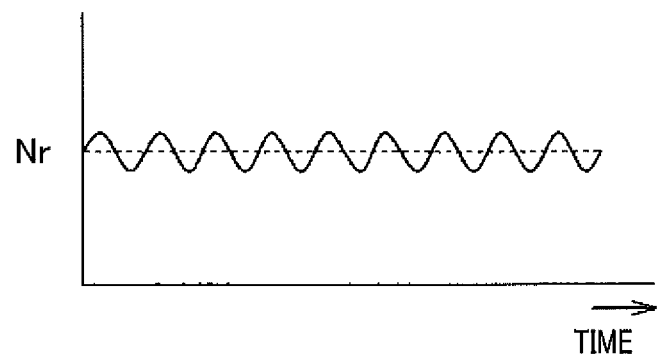
FIG. 4B is a graph schematically illustrating a processed rotational speed signal, to which the rotational-speed change reduction task has been applied, changes over time.

FIG. 4 schematically illustrates an example of the execution result of the rotational-speed change reduction task under the situations where the speed change ratio is being changed. In detail, FIG. 4A illustrates how the motor rotational speed Nm, to which the rotational-speed change reduction task has not been applied, changes over time. FIG. 4B illustrates how the processed rotational speed signal Nr, to which the rotational-speed change reduction task has been applied, changes over time.

FIGS. 6A and 6B show that the second ECU 24 of the first embodiment efficiently removes the change of the motor rotational speed Nm associated with change of the speed change ratio. In other words, FIGS. 6A and 6B show that the second ECU 24 of the first embodiment efficiently removes the steep inclination of change of the base of the motor rotational speed Nm, on which the vibration components Y are superimposed. This prevents the amplitudes of the compensation torque signals Tadd from excessively increasing, thus preventing the actual output torque Trqr of the motor-generator 10 from excessively increasing.

Otherwise, upon determination that the disabling mode is set in the second ECU 24 (NO in step S20), the routine proceeds to step S24. In step S24, the second ECU 24 serves as the selector 24b to select the motor rotational speed Nm(n) in the current processing cycle n as the selected rotational speed signal X(n) in the current processing cycle. Note that the motor rotational speed Nm measured every predetermined period Tecu is stored in the memory unit M as the history of the motor rotational speeds Nm.

After completion of the operation in step S22 or S24, the routine proceeds to step S26. The sequence of the operations in steps S26 to S32 constitutes the selection task.

Specifically, the second ECU 24 determines whether the second ECU 24 has been switched from the disabling mode to the enabling mode in the current processing cycle n in step S26. That is, the second ECU 24 determines whether the second ECU 24 has just been switched from the disabling mode to the enabling mode in step S26.

Upon determination that the second ECU 24 has been switched from the disabling mode to the enabling mode in the current processing cycle n (YES in step S26), the routine proceeds to step S28. In step S28, the second ECU 24 removes the history of the selected rotational speed signals X(n), X(n−1), and X(n−2) as input data to the filter processor 24d with the history of the processed rotational speed signals Nr(n), Nr(n−1), and Nr(n−2) stored in the memory unit M.

Otherwise, upon determination that the second ECU 24 has not been switched from the disabling mode to the enabling mode in the current processing cycle n (NO in step S26), the routine proceeds to step S30.

In step S30, the second ECU 24 determines whether the second ECU 24 has been switched from the enabling mode to the disabling mode in the current processing cycle n.

Upon determination that the second ECU 24 has been switched from the enabling mode to the disabling mode in the current processing cycle n (YES in step S30), the routine proceeds to step S32. In step S32, the second ECU 24 removes the history of the selected rotational speed signals X(n), X(n−1), and X(n−2) as input data to the filter processor 24d with the history of the motor rotational speed signals Nm(n), Nm(n−1), and Nm(n−2) stored in the memory unit M.

Otherwise, upon determination that the second ECU 24 has not been switched from the enabling mode to the disabling mode in the current processing cycle n (NO in step S30), the second ECU 24 terminates the routine in the current processing cycle n.

Note that the first embodiment sets the execution period of the sequence of the operations in steps S10 to S32, i.e. the predetermined period Tecu, to a value that enables the speed-change ratio change ΔR in the current processing cycle n to be sufficiently reduced.

Specifically, the operation in step S10 of the routine illustrated in FIG. 3 divides the input rotational speed Nin(n) by the output rotational speed Nout(n), thus calculating the speed change ratio Rcvt(n) in the current processing cycle n. This calculation method is a calculation method based on the understanding that the output rotational speed Nout (n) of the output end 16b coupled to the driving wheels 20 is largely unchanged. For this reason, if a value of the period Tecu was set to a larger value, the speed change ratio Rcvt(n) calculated in step S10 might deviate from the actual speed change ratio. This might result in a larger deviation between the target change amount ΔNcvt(n) calculated in step S14 and the actual target change amount, making it difficult to sufficiently remove the effects of the target change amount from change of the motor rotational speed Nm.

Thus, the first embodiment determines the relationship between the period Trez of each of the vibration components Y and the period Tecu satisfying the following equation:

$$Trex/Tecu = A$$

Where A represents any values within the range from 50 to 250 inclusive.

Determining the period Tecu to any values within the range from, for example, fiftieth part to two hundredth part of the periods Trez of the vibration components Y, which are greatly less than the periods Trez, causes the effects of change of the speed change ratio on the target change amount ΔNcvt to be negligible levels. This sufficiently removes the effects of the target change amount from change of the motor rotational speed Nm.

Figure 5A:
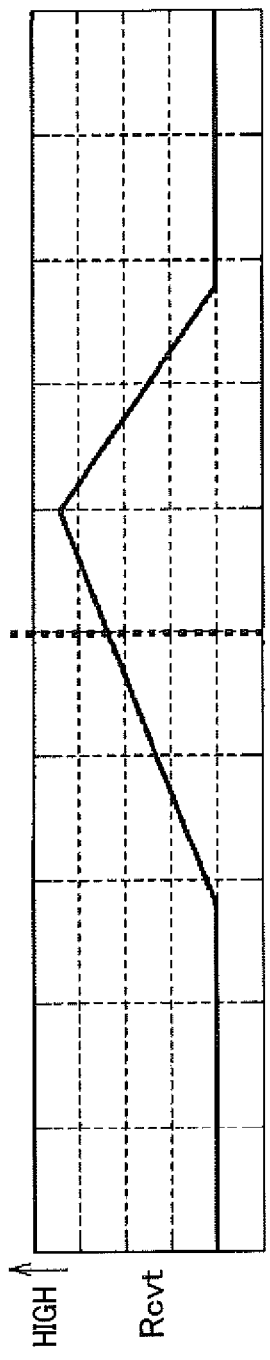
FIG. 5A is a graph schematically illustrating an example of how an actual speed change ratio changes over time.
Figure 5B:
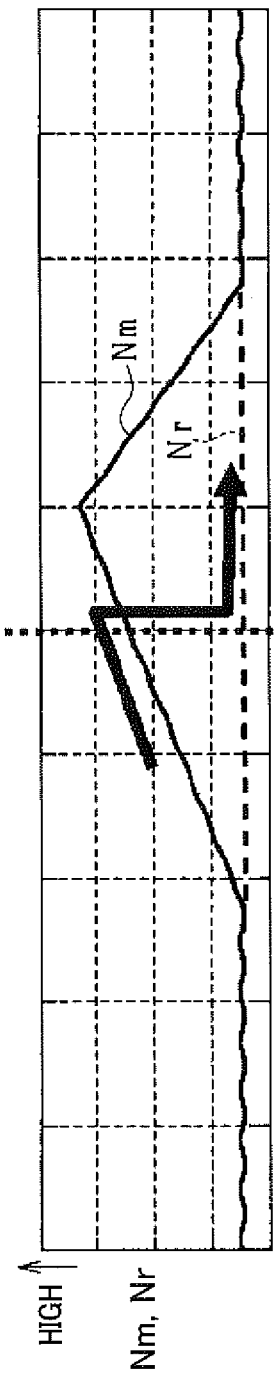
FIG. 5B is a graph schematically illustrating an example of how each of the motor rotational speed and the processed rotational speed changes over time.
Figure 5C:
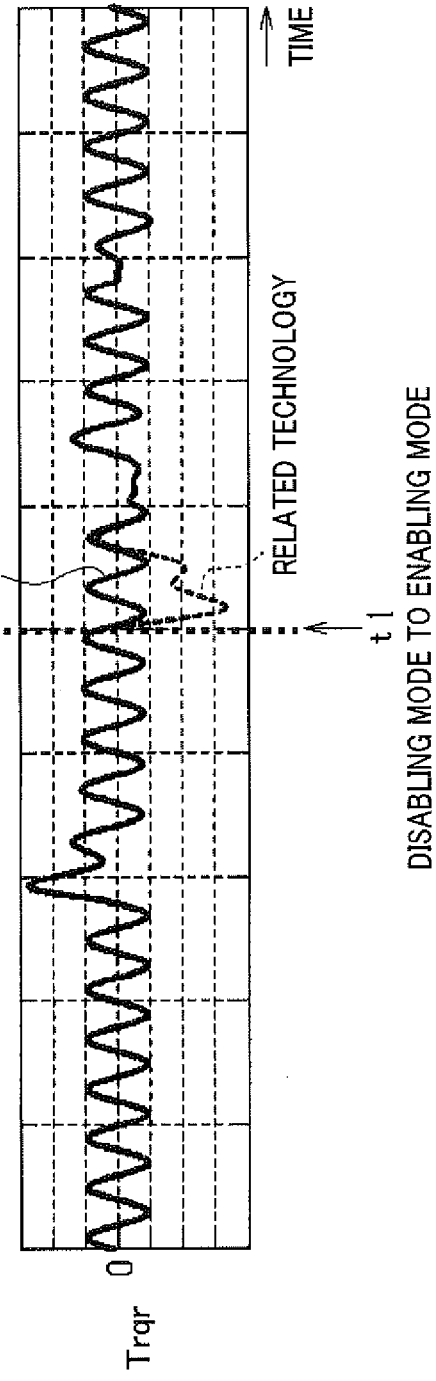
FIG. 5C is a graph schematically illustrating an example of how actual output torque changes over time.

FIG. 5 schematically illustrates an example of the execution result of the routine illustrated in FIG. 3. In detail, FIG. 5A illustrates an example of how the actual speed change ratio changes over time, and FIG. 5B illustrates an example of how each of the motor rotational speed Nm and the processed rotational speed Nr changes over time. FIG. 5C illustrates an example of how the actual output torque Trqr according to the first embodiment changes over time. In FIG. 5B, the vibration components Y are not clearly illustrated due to scale of FIG. 5B. In FIG. 5C, a dashed line represents an example of how the actual output torque Trer according to a related technology changes over time; the related technology is configured such that the operations in steps S26 to S32 are eliminated from the routine illustrated in FIG. 3.

FIGS. 5A to 5C demonstrate that, in the related technology, the selected rotational speed signal X is rapidly changed from the motor rotational speed Nm to the processed rotational speed signal Nr at time t1 when the second ECU 24 is switched from the disabling mode to the enabling mode.

This results in a stepped change from the last previous value X(n-1) of the selected rotational speed signal X corresponding to the last previous value Nm(n-1) of the motor rotational speed to the current value X(n) of the selected rotational speed signal X corresponding to the last previous value Nr(n-1) of the processed rotational speed signal Nr at the time t1.

Response of the filter processor 24d to the stepped change of the selected rotational speed X at or around the time t1 excessively increases the amplitudes of the compensation torque signals Tadd immediately after the time t1. This results in an excessive increase of the output torque Trqr due to the excessive increase of the amplitudes of the compensation torque signals Tadd (see the dashed line in FIG. 5C).

In contrast, the first embodiment prevents the selected rotational speed signal X, which is input to the filter processor 24d, from changing like a step function at or around the time t1 when the second ECU 24 is switched from the disabling mode to the enabling mode.

Similarly, the first embodiment prevents the selected rotational speed signal X, which is input to the filter processor 24d, from changing like a step function at or around a time when the second ECU 24 is switched from the enabling mode to the disabling mode.

This prevents the filter processor 24d from responding to such a stepped change of the selected rotational speed signal X at or around the time when the second ECU 24 is switched from one of the disabling mode and the enabling mode to the other thereof. This therefore prevents the amplitudes of the compensation torque signals Tadd from excessively increasing even if the second ECU 24 is switched from one of the disabling mode and the enabling mode to the other thereof, thus preventing an excessive increase of the output torque Trqr of the motor-generator 10. The above-described first embodiment therefore prevents the vehicle V from being subject to torque shock.

Second Embodiment

Figure 6:
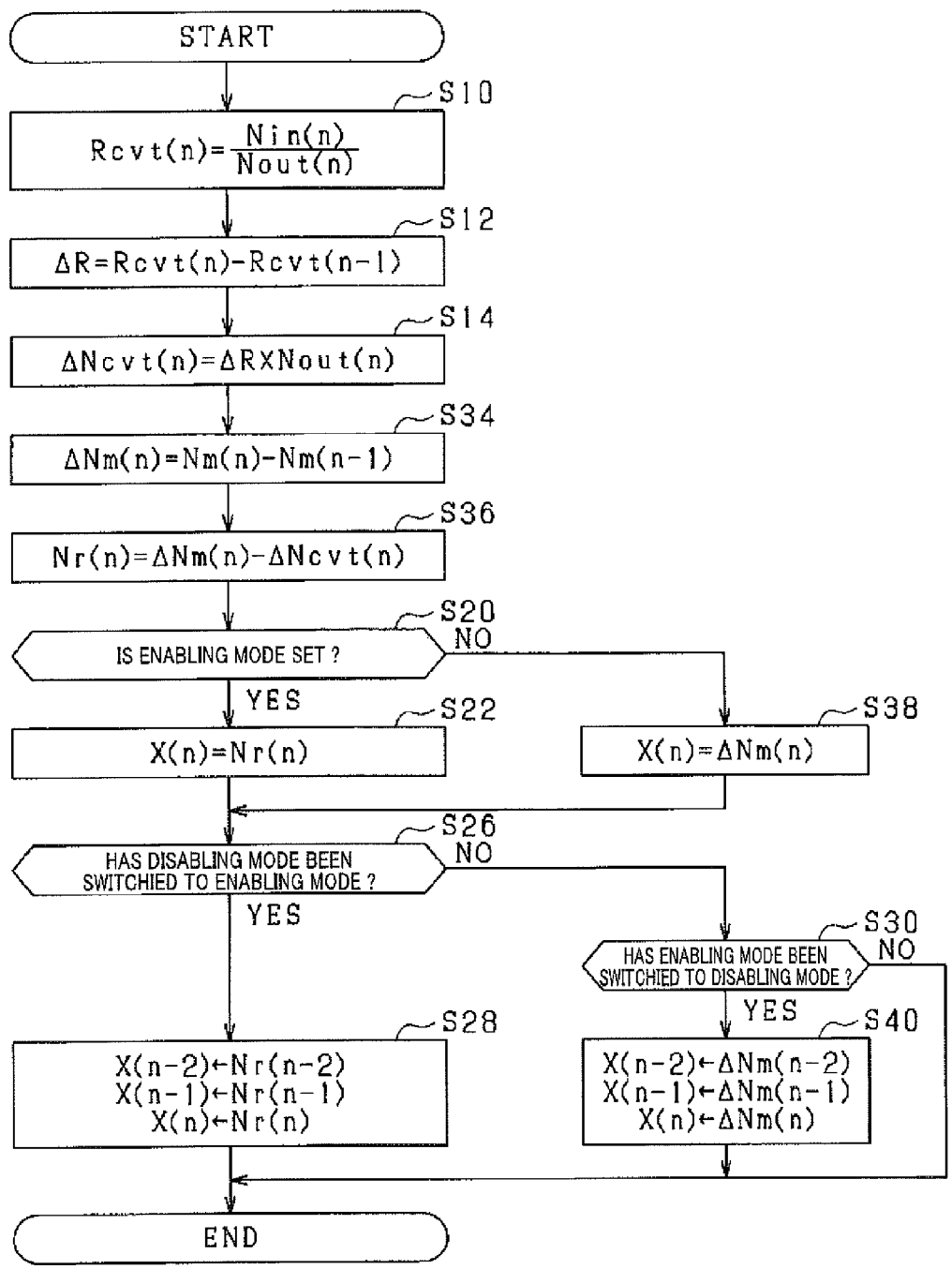
FIG. 6 is a flowchart schematically illustrating an example of a routine including a rotational-speed change reduction task and a selection task according to the second embodiment.

The following describes a second embodiment of the present disclosure with reference to FIG. 6 while focusing on the different points between the second embodiment and the first embodiment.

The second embodiment changes a rotational-speed change reduction task in comparison to that described in the first embodiment. Note that the second embodiment is configured such that a motor rotational-speed change ΔNm is input to the selector 24b in place of the motor rotational speed Nm. The motor rotational-speed change ΔNm represents an amount of change of the motor rotational speed Nm from a last previous process cycle to a current process cycle.

FIG. 6 schematically illustrates a routine of the rotational-speed change reduction task and a selection task according to the second embodiment. The second ECU 24, such as the change reducer 24a, the selector 24b, and the selection determiner 24c, performs the routine every predetermined period Tecu. Note that steps of the routine illustrated in FIG. 6, which are similar to those of the routine illustrated in FIG. 3, have been assigned with the same step numbers, and descriptions of the steps are therefore omitted or simplified.

After completion of the operation in step S14, the second ECU 24 subtracts, from the motor rotational speed Nm(n-1) obtained in the last previous processing cycle (n-1), the motor rotational speed Nm obtained in the current previous processing cycle n in step S34. This calculates a motor rotational-speed change ΔNm(n) in the current processing cycle n in step S34. Note that the first processing cycle (n=1) sets the motor rotational speed Nm(n-1) in the last previous processing cycle (n-1) to zero.

Following the operation in step S34, the second ECU 24 subtracts, from the motor rotational-speed change ΔNm(n) in the current processing cycle n, the target change amount ΔNcvt(n) in the current processing cycle n obtained in step S14, thus calculating a processed rotational speed signal Nr(n) in the current processing cycle n in step S36. The processed rotational speed signal Nr(n) includes no change amount of the motor rotational speed Nm associated with change of the speed change ratio.

After completion of the operation in step S36, the routine proceeds to step S20, and the second ECU 24 performs the determination in step S20.

Upon determination that the current condition of the vehicle V is not changing or not about to change to the predetermined condition in which acceleration request likely occurs (NO in step S20), the routine proceeds to step S38.

In step S38, the second ECU 24 serves as the selector 24b to select the motor rotational-speed change ΔNm(n) in the current processing cycle n as the selected rotational speed signal X(n) in the current processing cycle. Note that the motor rotational-speed change ΔNm(n) obtained for each processing cycle is stored in the memory unit M as the history of the motor rotational-speed changes ΔNm. After completion of the operation in step S38, the routine proceeds to step S26.

Upon determination that the second ECU 24 has been switched from the enabling mode to the disabling mode in the current processing cycle n (YES in step S30), the routine proceeds to step S40. In step S40, the second ECU 24 removes the history of the selected rotational speed signals X(n), X(n−1), and X(n−2) as input data to the filter processor 24*d* with the history of the motor rotational-speed changes ΔNm(n), ΔNm(n−1), and ΔNm(n−2) stored in the memory unit M.

As described above, the second embodiment prevents the selected rotational speed signal X, which is input to the filter processor 24*d*, from changing like a step function at a timing when the second ECU 24 is switched from one of the disabling mode and the enabling mode to the other thereof. Thus, the second embodiment achieves substantially the same effects as those achieved by the first embodiment.

Third Embodiment

Figure 7:
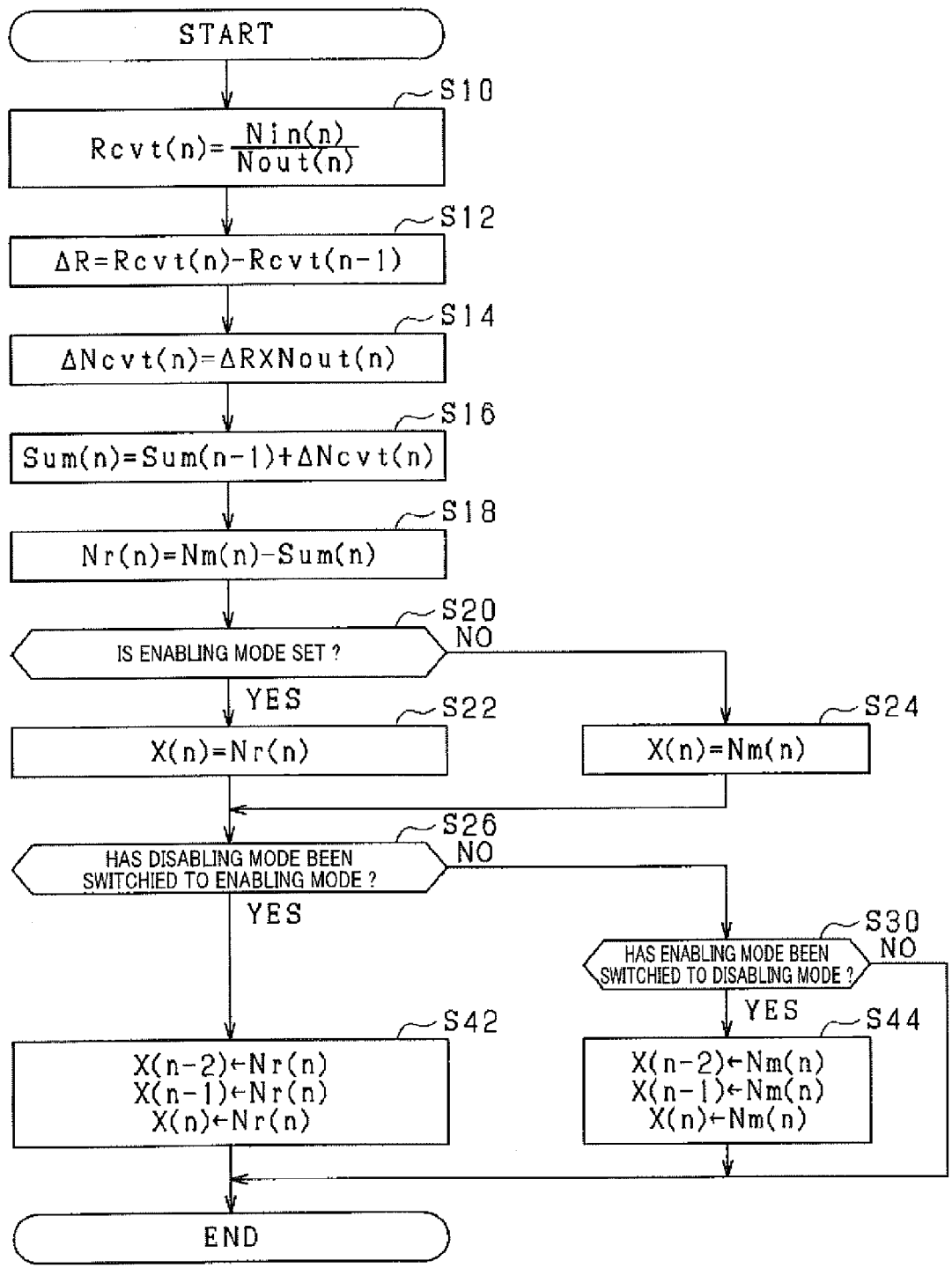
FIG. 7 is a flowchart schematically illustrating an example of a routine including a rotational-speed change reduction task and a selection task according to the third embodiment.

The following describes a third embodiment of the present disclosure with reference to FIG. 7 while focusing on the different points between the third embodiment and the first embodiment.

The third embodiment changes a selection task in comparison to that described in the first embodiment.

FIG. 7 schematically illustrates a routine of a rotational-speed change reduction task and the selection task according to the third embodiment. The second ECU 24, such as the change reducer 24*a*, the selector 24*b*, and the selection determiner 24*c*, performs the routine every predetermined period Tecu. Note that steps of the routine illustrated in FIG. 7, which are similar to those of the routine illustrated in FIG. 3, have been assigned to the same step numbers, and descriptions of the steps are omitted or simplified.

Upon determination that the second ECU 24 has been switched from the disabling mode to the enabling mode in the current processing cycle n (YES in step S26), the routine proceeds to step S42.

In step S42, the second ECU 24 removes all the selected rotational speed signals X(n), X(n−1), and X(n−2) as input data to the filter processor 24*d* with the processed rotational speed signal Nr(n) in the current processing cycle n.

Additionally, upon determination that the second ECU 24 has been switched from the enabling mode to the disabling mode in the current processing cycle n (YES in step S30), the routine proceeds to step S44.

In step S44, the second ECU 24 removes all the selected rotational speed signals X(n), X(n−1), and X(n−2) as input data to the filter processor 24*d* with the motor rotational speed Nm(n) in the current processing cycle n.

As described above, the third embodiment prevents the selected rotational speed signal X, which is input to the filter processor 24*d*, from changing like a step function at a timing when the second ECU 24 is switched from one of the disabling mode and the enabling mode to the other thereof. Thus, the third embodiment achieves substantially the same effects as those achieved by the first embodiment.

Fourth Embodiment

Figure 8:
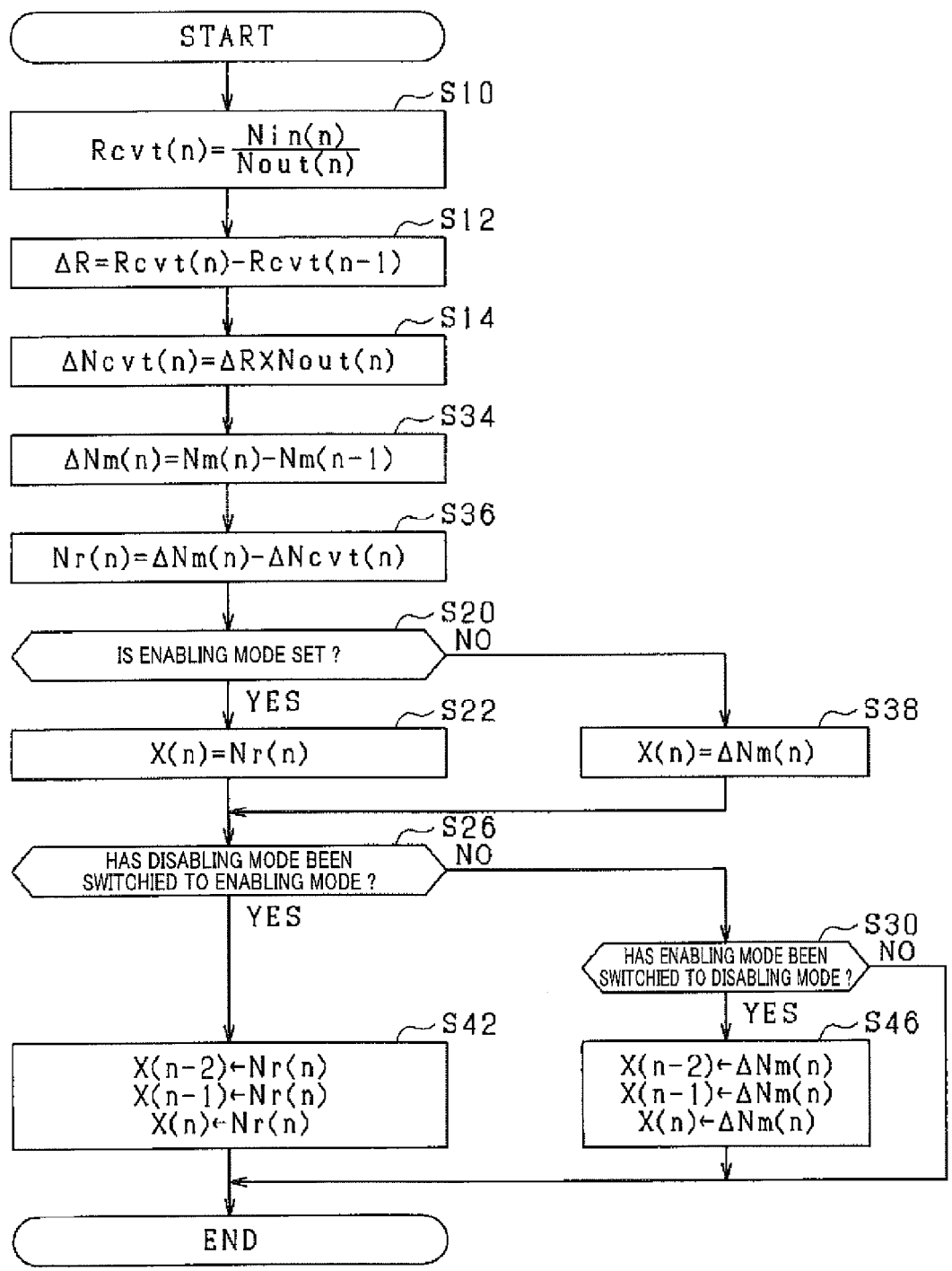
FIG. 8 is a flowchart schematically illustrating an example of a routine including a rotational-speed change reduction task and a selection task according to the fourth embodiment.

The following describes a fourth embodiment of the present disclosure with reference to FIG. 8 while focusing on the different points between the fourth embodiment and the second embodiment.

The fourth embodiment changes a selection task in comparison to that described in the second embodiment.

FIG. 8 schematically illustrates a routine of a rotational-speed change reduction task and the selection task according to the fourth embodiment. The second ECU 24, such as the change reducer 24*a*, the selector 24*b*, and the selection determiner 24*c*, performs the routine every predetermined period Tecu. Note that steps of the routine illustrated in FIG. 8, which are similar to those of the routine illustrated in FIGS. 6 and 7, have been assigned to the same step numbers, and descriptions of the steps are omitted or simplified.

Upon determination that the second ECU 24 has been switched from the disabling mode to the enabling mode in the current processing cycle n (YES in step S26), the routine proceeds to step S42 set forth above.

Additionally, upon determination that the second ECU 24 has been switched from the enabling mode to the disabling mode in the current processing cycle n (YES in step S30), the routine proceeds to step S46.

In step S46, the second ECU 24 removes all the selected rotational speed signals X(n), X(n−1), and X(n−2) as input data to the filter processor 24*d* with the motor rotational-speed change ΔNm(n) in the current processing cycle n.

As described above, the fourth embodiment prevents the selected rotational speed signal X, which is input to the filter processor 24*d*, from changing like a step function at a timing when the second ECU 24 is switched from one of the disabling mode and the enabling mode to the other thereof. Thus, the fourth embodiment achieves substantially the same effects as those achieved by the second embodiment.

Each of the first to fourth embodiments can be modified as follows.

In step S42 illustrated in FIG. 7, the second ECU 24 can remove all the selected rotational speed signals X(n), X(n−1), and X(n−2) as input data to the filter processor 24*d* with the processed rotational speed signal Nr(n−1) in the last previous processing cycle (n−1). In step S42, the second ECU 24 can remove all the selected rotational speed signals X(n), X(n−1), and X(n−2) as input data to the filter processor 24*d* with the processed rotational speed signal Nr(n−2) in the previous processing cycle (n−2) one processing cycle before the last previous processing cycle (n−1).

In step S44, the second ECU 24 can remove all the selected rotational speed signals X(n), X(n−1), and X(n−2) as input data to the filter processor 24*d* with the motor rotational speed Nm(n−1) in the last previous processing cycle (n−1). In step S44, the second ECU 24 can remove all the selected rotational speed signals X(n), X(n−1), and X(n−2) as input data to the filter processor 24*d* with the motor rotational speed Nm(n−2) in the previous processing cycle (n−2) one processing cycle before the last previous processing cycle (n−1).

In step S46 illustrated in FIG. 8, the second ECU 24 can remove all the selected rotational speed signals X(n), X(n−1), and X(n−2) as input data to the filter processor 24*d* with the motor rotational-speed change ΔNm(n−1) in the last previous current processing cycle (n−1). In step S46, the second ECU 24 can remove all the selected rotational speed signals X(n), X(n−1), and X(n−2) as input data to the filter processor 24*d* with the motor rotational-speed change ΔNm(n−2) in the previous current processing cycle (n−2) one processing cycle before the last previous processing cycle (n−1).

Figure 9:
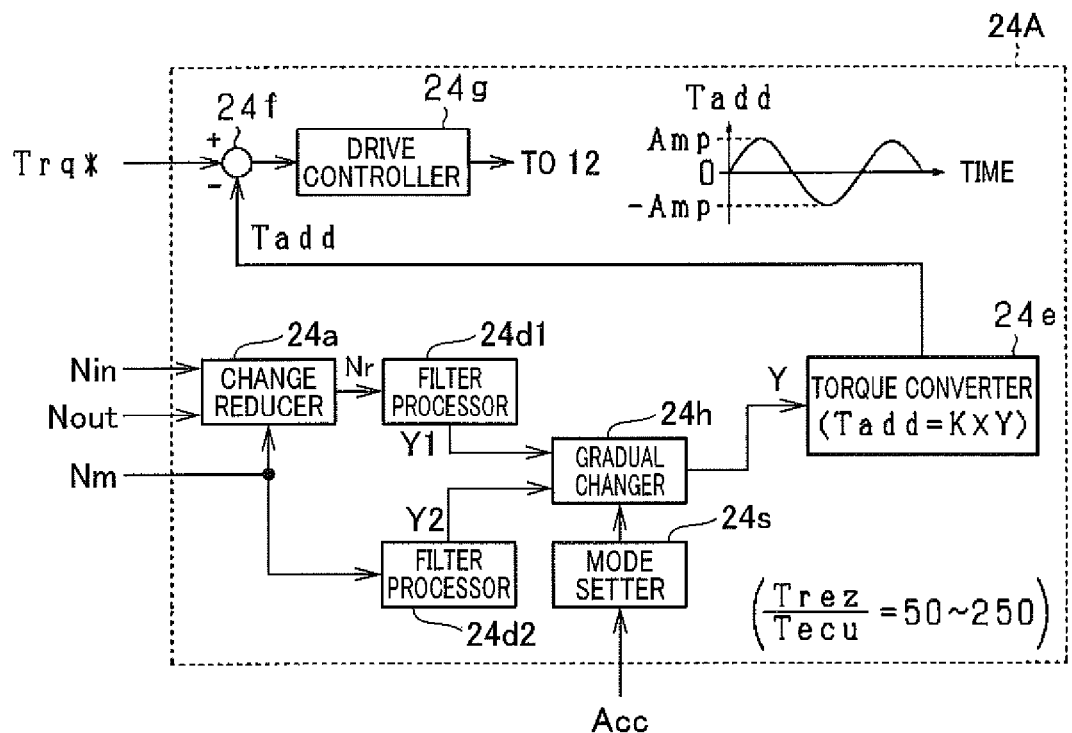
FIG. 9 is a block diagram schematically illustrating an example of the structure of a second ECU according to a further modification of the first embodiment.

A modification of the specific structure of a second ECU 24A for performing, every predetermined period Tecu, torque control based on the target torque Trq* with reference to the block diagram of FIG. 9. Note that elements of the specific structure illustrated in FIG. 9, which are similar to those of the specific structure illustrated in FIG. 2, have been assigned with the same reference numerals, and descriptions of the elements are therefore omitted or simplified.

Referring to FIG. 9, the second ECU 24A according to this modification includes a first filter processor 24*d*1, a second filter processor 24*d*2, and a gradual reducer 24*h* in addition to the change reducer 24*a*, the torque converter 24*e*, the corrector 24f, and the drive controller 24g. The components 24d1, 24d2, and the 24h are cooperative to suppress steep change of the vibration components Y used for calculation of the compensation torque signals Tadd at a timing when one of the enabling and disabling modes is switched to the other thereof.

The configuration of each of the first and second filter processors 24d1 and 24d2 is substantially identical to that of the filter processor 24d according to the first embodiment.

Specifically, the first filter processor 24d1 performs a known digital-filtering process on the processed rotational signal Nr using a bandpass filter, thus extracting first vibration components Y1 included in the processed rotational signal Nr output from the change reducer 24a. In the first filter processor 24d1, the selected rotational speed signals X(n), X(n−1), and X(n−2) included in the equation [eq1] should be read as the respective processed rotational signals Nr(n), Nr(n−1), and Nr(n−2), and the vibration components Y should be read as the first vibration components Y1. The first filter processor 24d1 outputs the first vibration components Y1 to the gradual changer 24h for each processing cycle.

The second filter processor 24d2 performs a known digital-filtering process on the motor rotational speed Nm using a bandpass filter, thus extracting second vibration components Y2 included in the motor rotational speed Nm. In the second filter processor 24d2, the selected rotational speed signals X(n), X(n−1), and X(n−2) included in the equation [eq1] should be read as the respective motor rotational speeds Nm(n), Nm(n−1), and Nm(n−2), and the vibration components Y should be read as the second vibration components Y2.

The second filter processor 24d2 outputs the second vibration components Y2 to the gradual changer 24h for each processing cycle.

The mode setter 24s switchably sets one of the enabling mode and the disabling mode in the second ECU 24 according to the user's operated stroke Acc of the user-operable accelerator pedal of the vehicle V, and outputs one of the enabling mode and the disabling mode to the gradual changer 24h.

The gradual changer 24h selects the first vibration components Y1 output from the first filter processor 24d1, and outputs the first selected vibration components Y1 to the torque converter 24e as the vibration components Y when determining that the second ECU 24 is set to the enabling mode according to the output of the mode setter 24s.

The gradual changer 24h also selects the second vibration components Y2 output from the second filter processor 24d2, and outputs the second vibration components Y2 to the torque converter 24e as the vibration components Y when determining that the second ECU 24 is set to the disabling mode according to the output of the mode setter 24s.

In particular, the gradual changer 24h gradually changes the vibration components Y that should be output to the torque converter 24e from the second vibration components Y2 to the first vibration components Y1 when determining that the second ECU 24 is switched from the disabling mode to the enabling mode. Additionally, the gradual changer 24h gradually changes the vibration components Y that should be output to the torque converter 24e from the first vibration components Y1 to the second vibration components Y2 when determining that the second ECU 24 is switched from the enabling mode to the disabling mode.

This configuration of the second ECU 24A according to this modification prevents the vibration components Y, which is input to the torque converter 24e, from changing like a step function at a timing when the second ECU 24 is switched from one of the disabling mode and the enabling mode to the other thereof. Thus, the configuration of the second ECU 24A according to this modification suppresses steep change of the vibration components Y used for calculation of the compensation torque signals Tadd at a timing when one of the enabling and disabling modes is switched to the other thereof. Thus, this modification achieves substantially the same effects as those achieved by the first embodiment.

Each of the first to fourth embodiments and their modifications uses the IIR filter as an example of bandpass filters, but can use a finite impulse response (FIR) filter as an example of bandpass filters.

The second ECU 24 can use the motor rotational speed Nm(n) as a substitute for the input rotational speed Nin(n) used in step S10. The second ECU 24 can calculate, according to the speed change ratio Rcvt(n) and the motor rotational speed Nm(n), the output rotational speed Nout (n) used in step S14. The second ECU 24 can use the input rotational speed Nin(n) in place of the motor rotational speed Nm(n) used in step S34, and can divide the output rotational speed Nout(n) by the speed change ratio Rcvt(n), thus calculating the motor rotational speed Nm(n).

The routine illustrated in FIG. 3 can eliminate the operation in step S10, and can use a target speed change ratio R*(n) in the current processing cycle n as substitute for the speed change ratio Rcvt(n) used in step S12.

Each of the first to fourth embodiments and their modifications uses a continuously variable transmission (CVT), i.e. a stepless transmission, 16 as an example of transmissions, but can use a stepped transmission. In this modification, changing the speed change ratio while the input and output shafts of the stepped transmission are coupled to each other causes vibration components, which vibrate at frequencies identical to the resonant frequency components of the drivetrain, to be included in the motor rotational speed Nm. For this reason, the motor speed-change reduction task can be efficiently applied to this modification.

Each of the first to fourth embodiments and their modifications can be applied to various vehicles in which a clutch is provided between the motor output shaft 10a and the input shaft 16a of the CVT 16. The motor speed-change reduction task can be efficiently applied to this modification when the motor output shaft 10a and the input shaft 16a of the CVT 16 are engaged with each other by the clutch. These vehicles, to which each of the first to third embodiments and their modifications can be applied, include not only vehicles equipped with a rotary electric machine as a main engine, but also vehicles equipped with an internal combustion engine and a rotary electric machine.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:
1. A control apparatus for a rotary electric machine of a vehicle, the vehicle being equipped with a drivetrain that includes a transmission for transmitting power output from rotation of a rotating member of the rotary electric machine to driving wheels according to a variable speed change ratio, the control apparatus comprising:
an extractor that extracts, from a rotational speed of the rotating member, a vibration component included in the rotational speed of the rotating member, the vibration component being based on vibrations of the drivetrain;
a compensation torque calculator that calculates, according to the vibration component extracted by the extractor, compensation torque that compensates for the vibrations of the drivetrain;
a controller that performs drive control of the rotary electric machine according to the compensation torque;
a first suppressor that performs first suppression to suppress the rotational speed of the rotating member from changing due to change of the speed change ratio;
a mode setter that switchably sets one of an enabling mode to enable the first suppression or a disabling mode to disable the first suppression in the control apparatus according to a parameter indicative of the speed change ratio; and
a second suppressor that performs second suppression to suppress change of the vibration component generated based on switching of one of the enabling mode and the disabling mode to the other thereof.

2. The control apparatus according to claim 1, wherein:
the extractor has a digital filter, and is configured to:
repeatedly receive a value of the rotational speed of the rotating member,
extract, from a first history of successive values of the rotational speed of the rotating member to which the first suppression has been applied, the vibration component included in the rotational speed of the rotating member using the digital filter upon the enabling mode being set in the control apparatus; and
extract, from a second history of successive values of the rotational speed of the rotating member to which no first suppression has been applied, the vibration component included in the rotational speed of the rotating member using the digital filter upon the disabling mode being set in the control apparatus; and
the second suppressor is configured to:
determine whether one of the enabling mode and the disabling mode has just been switched to the other thereof;
replace, as the second suppression, the successive values of the second history of the rotational speed of the rotating member with at least one of the successive values of the first history of the rotational speed of the rotating member when it is determined that the disabling mode has just been switched to the enabling mode; and
replace, as the second suppression, the successive values of the first history of the rotational speed of the rotating member with at least one of the successive values of the second history of the rotational speed of the rotating member when it is determined that the enabling mode has just been switched to the disabling mode.

3. The control apparatus according to claim 2, wherein:
the digital filter includes a bandpass filter having a predetermined passband including a resonant frequency of the drivetrain, and the extractor is configured to:
extract, as the vibration component, signal components included in the rotational speed of the rotating member; the signal components passing through the bandpass filter.

4. The control apparatus according to claim 1, wherein:
the first suppressor comprises:
a temporal change calculator configured to repeatedly calculate a value of temporal change of the rotational speed of the rotating member per a predetermined time; and
a target change calculator configured to repeatedly calculate, per the predetermined time, a value of target change of the rotational speed of the rotating member associated with change of the speed change ratio,
the first suppressor being configured to subtract each value of the target change of the rotational speed of the rotating member from a corresponding value of the temporal change of the rotational speed of the rotating member, thus outputting a value of subtracted temporal change of the rotational speed of the rotating member;
the extractor has a digital filter, and is configured to:
extract, from a first history of successive values of the subtracted temporal change of the rotational speed of the rotating member output from the first suppressor, the vibration component included in the rotational speed of the rotating member using the digital filter upon the enabling mode being set in the control apparatus;
extract, from a second history of successive values of the temporal change of the rotational speed of the rotating member, the vibration component included in the rotational speed of the rotating member using the digital filter upon the disabling mode being set in the control apparatus; and
the second suppressor is configured to:
determine whether one of the enabling mode and the disabling mode has just been switched to the other thereof;
replace, as the second suppression, the successive values of the second history of the temporal change of the rotational speed of the rotating member with at least one of the successive values of the first history of the subtracted temporal change of the rotational speed of the rotating member when it is determined that the disabling mode has just been switched to the enabling mode; and
replace, as the second suppression, the successive values of the first history of the subtracted temporal change of the rotational speed of the rotating member with at least one of the successive values of the second history of the temporal change of the rotational speed of the rotating member when it is determined that the enabling mode has just been switched to the disabling mode.

5. The control apparatus according to claim 4, wherein:
the rotating member includes an output shaft of the rotary electric machine,
the transmission includes a first shaft coupled to the output shaft, and a second shaft coupled to the driving wheels, and
the target change calculator includes a speed-change ratio calculator configured to calculate change of the speed change ratio per the predetermined time,
the target change calculator being configured to multiply a rotational speed of the second shaft by the change of the speed change ratio, thus calculating the target change of the rotational speed of the rotating member per the predetermined time.

6. The control apparatus according to claim 1, wherein:
the first suppressor comprises:
a target change calculator configured to repeatedly calculate, per a predetermined time, a value of target change of the rotational speed of the rotating member associated with change of the speed change ratio, the first suppressor being configured to subtract each value of the target change of the rotational speed of the rotating member from a corresponding value of the rotational speed of the rotating member, thus outputting a value of subtracted rotational speed of the rotating member;

the extractor has a digital filter, and is configured to:

extract, from a first history of successive values of the subtracted rotational speed of the rotating member output from the first suppressor, the vibration component included in the rotational speed of the rotating member using the digital filter upon the enabling mode being set in the control apparatus;

extract, from a second history of successive values of the rotational speed of the rotating member, the vibration component included in the rotational speed of the rotating member using the digital filter upon the disabling mode being set in the control apparatus; and the second suppressor is configured to:

determine whether one of the enabling mode and the disabling mode has just been switched to the other thereof;

replace, as the second suppression, the successive values of the second history of the rotational speed of the rotating member with at least one of the successive values of the first history of the subtracted rotational speed of the rotating member when it is determined that the disabling mode has just been switched to the enabling mode; and replace, as the second suppression, the successive values of the first history of the subtracted rotational speed of the rotating member with at least one of the successive values of the second history of the rotational speed of the rotating member when it is determined that the enabling mode is switched to the disabling mode.

7. The control apparatus according to claim 1, wherein:

the first suppressor comprises:

a target change calculator configured to cyclically calculate, per a predetermined time, a value of target change of the rotational speed of the rotating member associated with change of the speed change ratio; and an integrator configured to add, for each cycle, a currently calculated value of the target change of the rotational speed of the rotating member to an integrated value of the previously calculated values of the target change of the rotational speed of the rotating member, thus calculating an integrated value of the target change of the rotational speed of the rotating member for each cycle;

the first suppressor being configured to subtract the integrated value of the target change of the rotational speed of the rotating member for each cycle from a corresponding value of the rotational speed of the rotating member, thus outputting a value of subtracted rotational speed of the rotating member for each cycle;

the extractor has a digital filter, and is configured to:

extract, from a first history of successive values of the subtracted rotational speed of the rotating member output from the first suppressor, the vibration component included in the rotational speed of the rotating member using the digital filter upon the enabling mode being set in the control apparatus;

extract, from a second history of successive values of the rotational speed of the rotating member, the vibration component included in the rotational speed of the rotating member using the digital filter upon the disabling mode being set in the control apparatus; and the second suppressor is configured to:

determine whether one of the enabling mode and the disabling mode has just been switched to the other thereof;

replace, as the second suppression, the successive values of the second history of the rotational speed of the rotating member with at least one of the successive values of the first history of the subtracted rotational speed of the rotating member when it is determined that the disabling mode has just been switched to the enabling mode; and replace, as the second suppression, the successive values of the first history of the subtracted rotational speed of the rotating member with at least one of the successive values of the second history of the rotational speed of the rotating member when it is determined that the enabling mode is switched to the disabling mode.

8. The control apparatus according to claim 1, wherein the transmission includes a continuously variable transmission capable of continuously chanting the speed change ratio while maintaining the power transmittable between the rotary electric machine and the driving wheels.

9. A control apparatus for a rotary electric machine of a vehicle, the vehicle being equipped with a drivetrain that includes a transmission for transmitting power output from rotation of a rotating member of the rotary electric machine to driving wheels according to a variable speed change ratio, the control apparatus comprising a suppressor that performs first suppression to suppress a rotational speed of the rotating member from changing associated with change of the speed change ratio;

a first extractor that extracts, from a suppressed rotational speed of the rotating member to which the first suppression has been applied, a first vibration component included in the suppressed rotational speed of the rotating member, the first vibration component being based on vibrations of the drivetrain;

a second extractor that extracts, from the rotational speed of the rotating member, a second vibration component included in the rotational speed of the rotating member, the second vibration component being based on vibrations of the drivetrain;

a mode setter that switchably sets one of an enabling mode to enable the first suppression and a disabling mode to disable the first suppression in the control apparatus according to a parameter indicative of the speed change ratio;

a compensation torque calculator that calculates, according to a final vibration component input thereto, compensation torque that compensates for the vibrations of the drivetrain;

a controller that performs drive control of the rotary electric machine according to the compensation torque; and a gradual changer that:

selects the first vibration component to thereby output the first vibration component to the compensation torque calculator as the final vibration component upon the enabling mode being set in the control apparatus;

selects the second vibration component to thereby output the second vibration component to the compensation torque calculator as the final vibration component upon the disabling mode being set in the control apparatus;

gradually changes the final vibration component to be output to the controller from the second vibration component to the first vibration component upon the disabling mode having been switched to the enabling mode; and gradually changes the final vibration component to be output to the controller from the first vibration component to the second vibration component upon the enabling mode having been switched to the disabling mode.

* * * * *